(12) United States Patent
Nakata et al.

(10) Patent No.: US 7,497,750 B2
(45) Date of Patent: Mar. 3, 2009

(54) WATER COOLING DEVICE FOR OUTBOARD MOTOR

(75) Inventors: Jun Nakata, Shizuoka-ken (JP); Atsushi Nakamura, Shizuoka-ken (JP)

(73) Assignee: Yamaha Marine Kabushiki Kaisha, Hamamatsu-Shi, Shizuoka-Ken (JP)

( * ) Notice: Subject to any disclaimer, the term of this patent is extended or adjusted under 35 U.S.C. 154(b) by 245 days.

(21) Appl. No.: 11/133,986

(22) Filed: May 20, 2005

(65) Prior Publication Data

US 2005/0279294 A1 Dec. 22, 2005

(30) Foreign Application Priority Data

May 20, 2004 (JP) ............................... 2004-150994

(51) Int. Cl.
- *B63H 21/14* (2006.01)
- *F01P 3/20* (2006.01)
- *F02B 61/04* (2006.01)
- *F01N 7/00* (2006.01)
- *F01N 3/04* (2006.01)
- *B63H 20/24* (2006.01)
- *B63H 20/28* (2006.01)

(52) U.S. Cl. ................... 440/88 C; 440/88 G; 440/88 J; 440/88 K

(58) Field of Classification Search ............... 440/88 C, 440/88 G, 88 J, 88 K, 89 B, 89 C, 89 D, 89 F, 440/89 R See application file for complete search history.

(56) References Cited

U.S. PATENT DOCUMENTS

| 2,209,301 | A | * | 7/1940 | Johnson et al. ............... 440/76 |
| 2,988,069 | A | * | 6/1961 | James ..................... 123/41.15 |
| 4,354,849 | A | * | 10/1982 | Sanmi et al. ............... 440/88 R |
| 5,232,387 | A | * | 8/1993 | Sumigawa ................. 440/89 D |
| 5,439,404 | A | * | 8/1995 | Sumigawa ................. 440/88 L |
| 5,803,043 | A |   | 9/1998 | Bayron et al. |

(Continued)

FOREIGN PATENT DOCUMENTS

JP  09-088623  3/1997

(Continued)

OTHER PUBLICATIONS

Co-Pending U.S. Appl. No. 11/617,545, filed Dec. 28, 2006. Title: Outboard Motor. Inventors: Takayuki Osakabe et al.

(Continued)

*Primary Examiner*—Lars A Olson
*Assistant Examiner*—Daniel V Venne
(74) *Attorney, Agent, or Firm*—Knobbe, Martens, Olson & Bear, LLP

(57) ABSTRACT

A water cooling system for an outboard motor can include a casing that is configured to be submerged in water at a lower part thereof and to support an internal combustion engine on an upper part thereof. The system can have an exhaust passage that is formed in the casing and through which exhaust gas from the internal combustion engine is inducted from the upper part of the casing toward the lower part, a portion of the exhaust passage between an upstream-side passage and a downstream-side passage being configured as an expansion chamber. Also provided is a cooling water passage extending along the exhaust passage and a drain port that permits water to be discharged into the downstream-side passage after passing through the cooling water passage.

3 Claims, 10 Drawing Sheets

U.S. PATENT DOCUMENTS

| | | |
|---|---|---|
| 5,813,886 A | 9/1998 | Shomura |
| 5,823,835 A | 10/1998 | Takashi et al. |
| 5,875,745 A | 3/1999 | Watanabe et al. |
| 5,893,783 A * | 4/1999 | Hiraoka et al. ............ 440/88 R |
| 5,941,205 A | 8/1999 | Hiraoka et al. |
| 6,045,421 A | 4/2000 | Hiraoka et al. |
| 6,062,927 A | 5/2000 | Hiraoka et al. |
| 6,109,231 A | 8/2000 | Watanabe et al. |
| 6,253,729 B1 | 7/2001 | Suzuki et al. |
| 6,298,815 B1 | 10/2001 | Kashima et al. |
| 6,497,214 B2 | 12/2002 | Yagi |
| 6,536,409 B1 | 3/2003 | Takahashi et al. |
| 6,699,085 B2 | 3/2004 | Hattori |
| 6,733,350 B2 | 5/2004 | Iida et al. |
| 6,752,673 B2 | 6/2004 | Nakata et al. |
| 6,964,255 B2 | 11/2005 | Shomura et al. |
| 6,997,157 B2 | 2/2006 | Ikuma et al. |
| 2001/0008819 A1 * | 7/2001 | Ikuma et al. ................. 440/88 |
| 2005/0056012 A1 | 3/2005 | Wild et al. |
| 2005/0229891 A1 | 10/2005 | Kokubo |

FOREIGN PATENT DOCUMENTS

JP  2003-003844  1/2003

OTHER PUBLICATIONS

Co-Pending U.S. Appl. No. 10/714,759, filed Nov. 17, 2003, now published as US-2004-0094123-A1 May 20, 2004. Title: Air Intake Device for Engine. Inventors: Masanori Takahashi et al.

* cited by examiner

WATER COOLING DEVICE FOR OUTBOARD MOTOR

PRIORITY INFORMATION

This application is based on and claims priority to Japanese Patent Application No. 2004-150994, filed May 20, 2004, the entire contents of which is hereby expressly incorporated by reference.

BACKGROUND OF THE INVENTIONS

1. Field of the Inventions

The present inventions relate to a water cooling device for an outboard motor having a water-cooled casing.

2. Description of the Related Art

Watercraft can use one or more outboard motors which include a casing supportable by a hull and which have lower potions adapted to be submerged in a body of water. An internal combustion engine is supported at the upper end of the casing. An exhaust passage is formed in the casing. The exhaust passage guides exhaust gas discharged from the internal combustion engine, from the upper end of the casing toward the lower end, to be discharged in the body of water from the lower end. The intermediate section between an upstream-side passage and a downstream-side passage in the exhaust passage can be used as an expansion chamber. A cooling water passage extending along the exhaust passage is formed in the casing. The downstream end of the cooling water passage is open to the expansion chamber. Such an outboard motor is disclosed in Japanese Patent Publication No. JP-A-2003-3844.

When the internal combustion engine is driven, the watercraft is propelled. In this case, driving of the internal combustion engine allows exhaust gas discharged from the internal combustion engine to be discharged into the body of water through the exhaust passage. The exhaust gas passes through the expansion chamber in the exhaust passage to thereby reduce its exhaust noise. The casing is heated by the exhaust gas passing through the exhaust passage. When the casing is heated by the exhaust gas to a high temperature, water sticking on the external surface of the casing is evaporated by the heat. Therefore, if the water is seawater, as a result of the evaporation, the calcium content in seawater sticks on the external surface of the casing, which might cause whitening of the external surface. This whitening unfavorably lowers the quality of external appearance of the outboard motor.

SUMMARY OF THE INVENTION

When water is discharged into the expansion chamber after passing through the cooling water passage, the exhaust gas in the expansion chamber is at a high temperature. Therefore, the sulfur content in the exhaust gas and the water discharged into the expansion chamber tend to chemically react. This chemical reaction produces sulfuric acid and unnecessarily causes corrosion of the inside surface of the expansion chamber, which is unfavorable to the life of the outboard motor.

Accordingly, one aspect of at least one of the inventions disclosed herein involves reducing the temperature of the exhaust gas before mixing the gas with water. When a casing for the passage of exhaust gas is cooled by water, the exhaust gas can be cooled before combining it with the water, and thus, the life of the outboard motor may be improved by reducing the amount sulfuric acid in the expansion chamber.

Thus, in accordance with an embodiment, a water cooling system for an outboard motor is provided having a casing that is configured to be submerged in water at a lower part thereof and to support an internal combustion engine on an upper part thereof and an exhaust passage that is formed in the casing and through which exhaust gas from the internal combustion engine is inducted from the upper part of the casing toward the lower part, a portion of the exhaust passage between an upstream-side passage and a downstream-side passage being configured as an expansion chamber. The system also has a cooling water passage extending along the exhaust passage and a drain port that permits water to be discharged into the downstream-side passage after passing through the cooling water passage.

In accordance with another embodiment, a water cooling system for an outboard motor having an internal combustion engine is provided having an exhaust passage that is formed in a casing and through which exhaust gas is discharged from the internal combustion engine, a portion of the exhaust passage between an upstream-side passage and a downstream-side passage being configured as an expansion chamber. The system also has a cooling water passage extending along the exhaust passage and configured to receive water from a water pump and a drain port that discharges water into the downstream-side passage after passing through the cooling water passage.

BRIEF DESCRIPTION OF THE DRAWINGS

These and other features and advantages of the inventions will become more apparent upon reading the following detailed description and with reference to the accompanying drawings of an embodiment that exemplifies the inventions, in which.

DETAILED DESCRIPTION OF THE PREFERRED EMBODIMENTS

In a watercraft that utilizes an outboard motor in which a casing of the motor is cooled by water, the production of sulfuric acid in the exhaust system may be reduced by lowering the temperature of the exhaust gas before combining the water and exhaust gas, thus improving the life of the outboard motor. The temperature of the exhaust gas can be lowered by cooling an exhaust passage formed in the casing for the discharge of exhaust gas from an internal combustion engine with the water.

The motor can include a casing supportable by a hull and having a lower portion adapted to be submerged in the body of water. The motor can also include an internal combustion engine supported at an upper end of the casing. An exhaust passage can be formed in the casing through which exhaust gas from the internal combustion engine is guided from the upper end of the casing toward the lower end, to be discharged from the lower end into the body of water. An intermediate section of the exhaust passage between an upstream-side passage and a downstream-side passage is used as an expansion chamber, and a cooling water passage extending along the exhaust passage is formed in the casing. A drain port, through which water is discharged into the downstream-side passage after passing through the cooling water passage, is open to the downstream-side passage.

Figure 1:
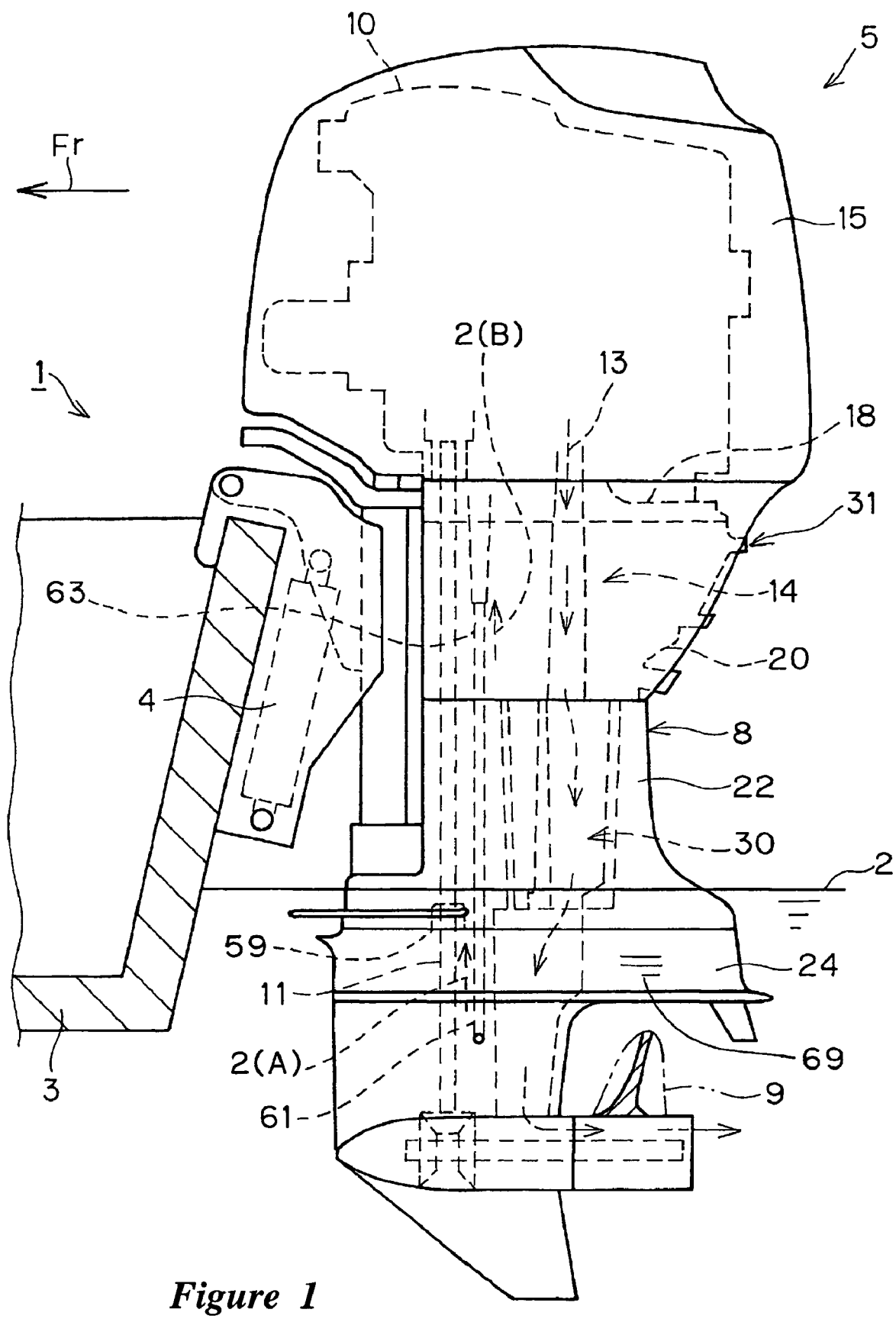
FIG. 1 is a sectional view of the whole of an outboard motor.

In FIG. 1, reference numeral 1 designates a watercraft. The watercraft 1 comprises a hull 3 floated on the surface of the water 2 and an outboard motor 5 supported by a bracket 4 at the rear end of the hull 3. Arrow Fr in the figure shows the propulsion direction of the watercraft 1, or the front. The inventions disclosed herein are disclosed in the context of outboard motors because these inventions have particular utility in this context. However, the inventions disclosed herein can also be used in other contexts, including exhaust systems for other types of engines used to power other types of vehicles and other types of machines.

The outboard motor 5 include the following: a casing 8 extending vertically, supported at the upper part by the bracket 4 and submerged at the lower part in the body of water 2; a propeller 9 supported for rotation by the casing 8 at the lower end; an internal combustion engine 10 supported on the top surface of the casing 8; a power transmission 11 housed in the casing 8 for connecting the propeller 9 to a crankshaft of the internal combustion engine 10; an intake device for supplying a mixture of air in the atmosphere and fuel to the internal combustion engine 10; an exhaust device 14 for inducting exhaust gas 13 from the internal combustion engine 10 into the body of water 2 and the atmosphere; and a cowling 15 for covering the internal combustion engine 10 and the intake device integrally from outside.

The casing 8 can be made by aluminum casting, or with other materials and/or using other manufacturing techniques. The casing 8 can include the following: a guide exhaust 18 forming the upper part of the casing 8 for supporting the internal combustion engine 10 on the top surface; an oil pan 20 attached to the bottom surface of the guide exhaust 18 with fastening members 19; an upper casing 22 attached to the bottom surface of the oil pan 20 with fastening members 21; a lower casing 24 attached to the bottom surface of the upper casing 22 with fastening members 23 for supporting the propeller 9; and a partition plate 26 disposed between the oil pan 20 and the upper casing 22 and attached to the bottom surface of the oil pan 20 with fastening members 25.

A storage chamber 28 of lubricating oil can be formed in the oil pan 20. The lubricating oil can be supplied to portions-to-be-lubricated by an oil pump (not shown) operating with the internal combustion engine 10. Lubricating oil can be returned to the storage chamber 28 after lubricating these portions-to-be-lubricated.

Referring to the exhaust device 14, an exhaust passage 30 can be formed in the casing 8 through which exhaust gas 13 from the internal combustion engine 10 is guided from the upper end of the casing 8 toward the lower end and discharged from the lower end into the body of water 2. Also, a branch passage 31 can be formed in the casing 8 which branches from the longitudinal middle of the exhaust passage 30 and through which at least part (double dot and dash lines in FIG. 2 and FIG. 6) of the exhaust gas 13 in the exhaust passage 30 is discharged directly into the atmosphere.

Expansion chambers 36, 37 can be formed in the middle of the exhaust passage 30 and in the middle of the branch passage 31 between their upstream-side passages 32, 33 and their downstream-side passages 34, 35, respectively. These expansion chambers 36, 37 can have sectional areas larger than their upstream-side passages 32, 33, respectively.

The guide exhaust 18, oil pan 20 and partition plate 26 are formed with through-holes 39, 40, 41 passing therethrough vertically and in communication with each other, respectively. An exhaust pipe 42 is inserted in the through-hole 40 of the oil pan 20 at the lower part, and the lower end of the exhaust pipe 42 is inserted in the through-hole 41 of the partition plate 26. The exhaust pipe 42 is attached to the guide exhaust 18 and oil pan 20 with fastening members 19, 43. The through-hole 39 of the guide exhaust 18, the through-hole 40 in the upper part of the oil pan 20 and the inside hole of the exhaust pipe 42 are in communication with each other and these holes form the upstream-side passage 32 of the exhaust passage 30.

The upper casing 22 can be formed with a through-hole 46 passing therethrough vertically. The muffler 47 can be inserted in the through-hole 46 and the upper end of the muffler 47 can be attached to the oil pan 20 and the partition plate 26 with fastening members 21, 48. The inside hole of the muffler 47 constitutes the expansion chamber 36 of the exhaust passage 30. The lower end of the upstream-side passage 32 in the exhaust pipe 42 is in communication with the upper end of the expansion chamber 36 in the muffler 47. The lower casing 24 is formed with the downstream-side passage 34 of the exhaust passage 30. The lower end of the expansion chamber 36 in the muffler 47 is in communication with the upper end of the downstream-side passage 34 in the lower casing 24.

Figure 4:
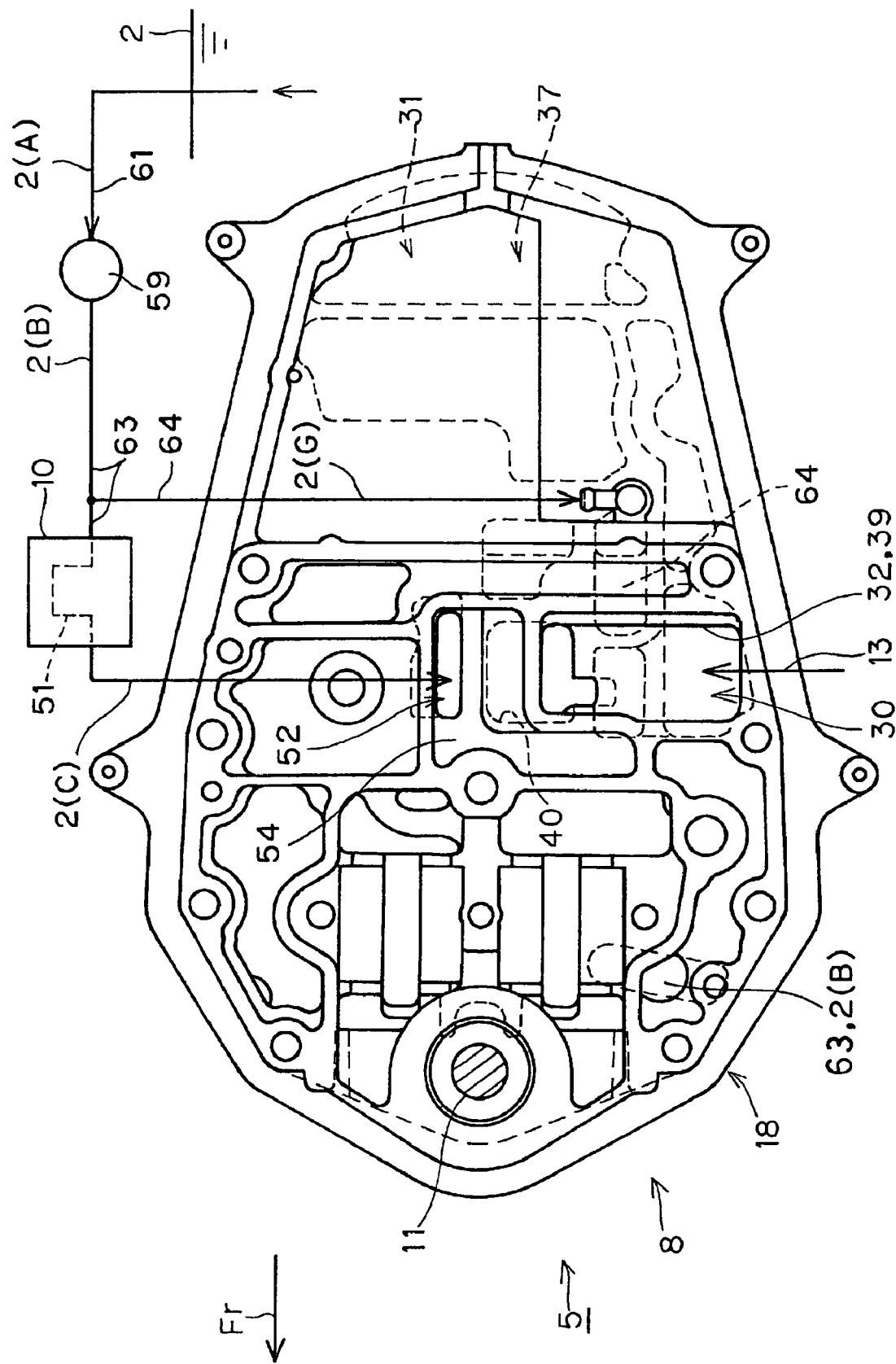
FIG. 4 is a view taken along the line 4-4 in FIG. 2.

The motor 5 can also include a water cooling device for cooling the internal combustion engine 10 and the casing 8 with water 2. As shown in FIG. 4, a cooling water passage 51 can be formed in the cylinder of the internal combustion engine 10. Another cooling water passage 52 can be formed in the casing 8.

As shown in FIGS. 2 and 4 to 7, one section 54 of the cooling water passage 52 in the casing 8 can be formed between the inside circumferential surface of the through-hole 40 in the oil pan 20 and the outside circumferential surface of the exhaust pipe 42. The one section 54 of the cooling water passage 52 can extend vertically along the exhaust passage 30 in the exhaust pipe 42. The lower end of the one section 54 of the cooling water passage 52 opens downward of the oil pan 20 and the opening is closed by the partition plate 26. Also, an overflow opening 55 for connecting the upper part of the one section 54 of the cooling water passage 52 to the outside can be formed in the oil pan 20 of the casing 8.

As shown in FIGS. 2, 3, 9 and 10, the other section 56 of the cooling water passage 52 in the casing 8 can be formed between the inside circumferential surface of the through-hole 46 of the upper casing 22 and the outside circumferential surface of the muffler 47. The other section 56 of the cooling water passage 52 extends vertically along the exhaust passage 30 in the muffler 47 and has a bottom 57 formed by the upper casing 22. Also, another overflow opening 58 for connecting the upper part of the other section 56 of the cooling water passage 52 to the outside is formed in the upper casing 22 of the casing 8. The other overflow opening 58 is disposed below the one section 54 of the cooling water passage 52.

Figure 3:
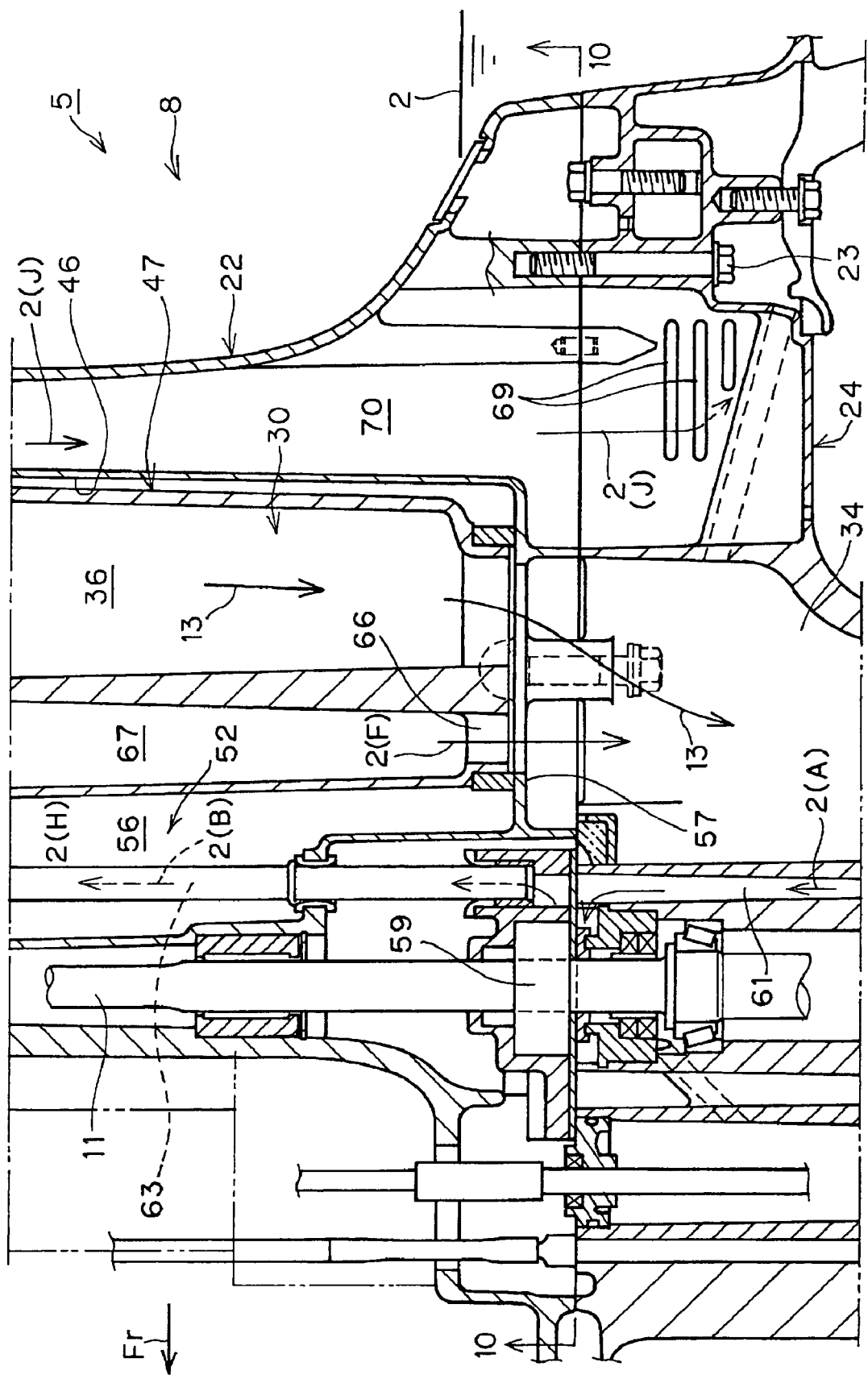
FIG. 3 is an enlarged sectional view of another portion of FIG. 1.

In FIGS. 1 and 3, there is provided a water pump 59 for drawing water 2 from the body of water 2 while supplying the water 2 to the cooling water passages 51, 52. The water pump 59 is disposed between the upper casing 22 and the lower casing 24 and connected to the internal combustion engine 10 for operation therewith through the power transmission 11. An intake passage 61 for the communication of the body of water 2 with an intake port of the water pump 59 is formed in the lower casing 24.

In FIGS. 1 to 6, there is provided a first supply passage 63 for the communication of a delivery port of the water pump 59 with the one section 54 of the cooling water passage 52 in the casing 8 through the cooling water passage 51 of the internal combustion engine 10. Also, a second supply passage 64 is provided for the communication of the delivery port of the water pump 59 directly with the other section 56 of the cooling water passage 52 in the casing 8. The second supply passage 64 branches from the first supply passage 63 from the water pump 59 to the cooling water passage 51 of the internal combustion engine 10 and is in communication with the other section 56 of the cooling water passage 52.

Figure 2:
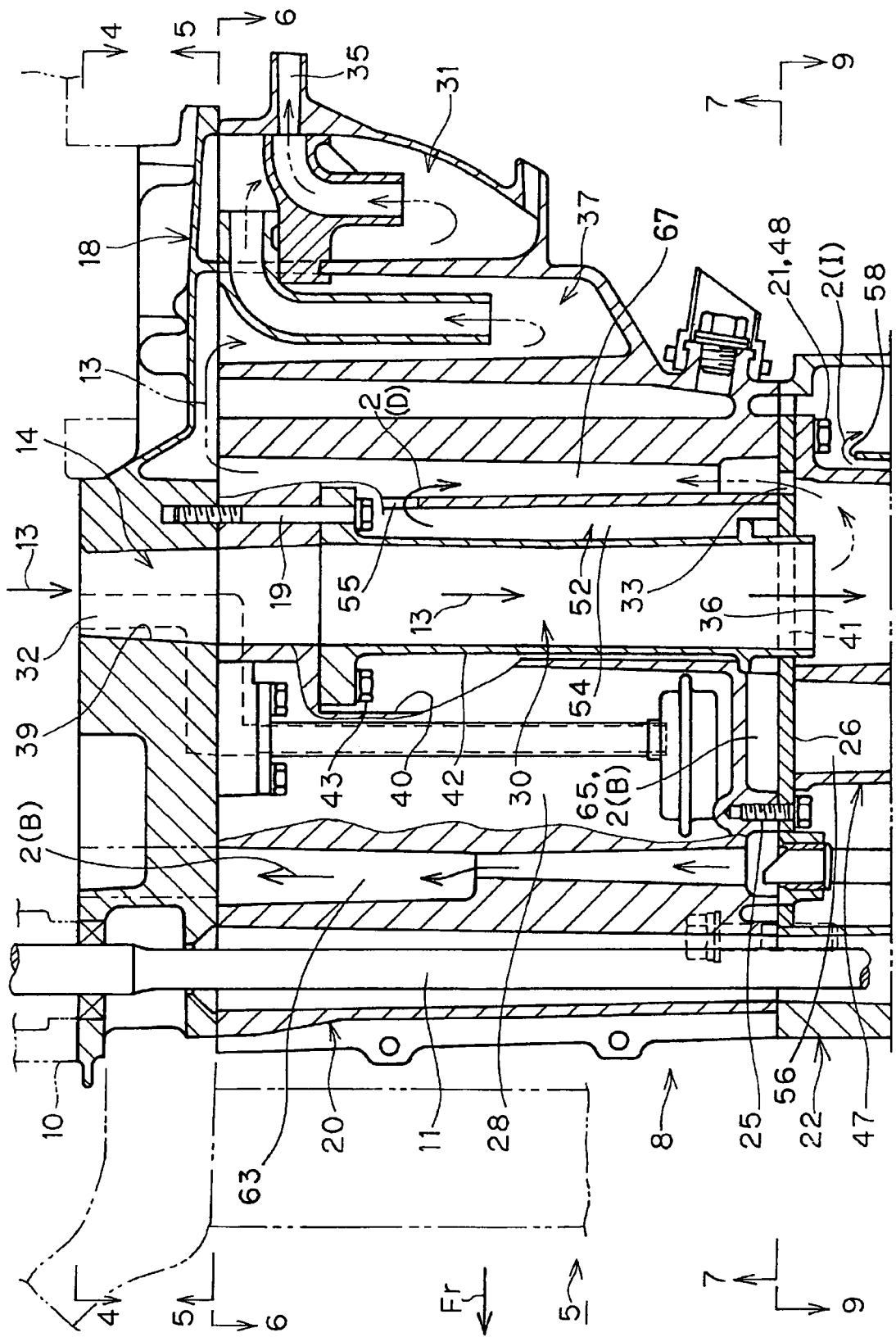
FIG. 2 is an enlarged sectional view of one portion of FIG. 1.
Figure 7:
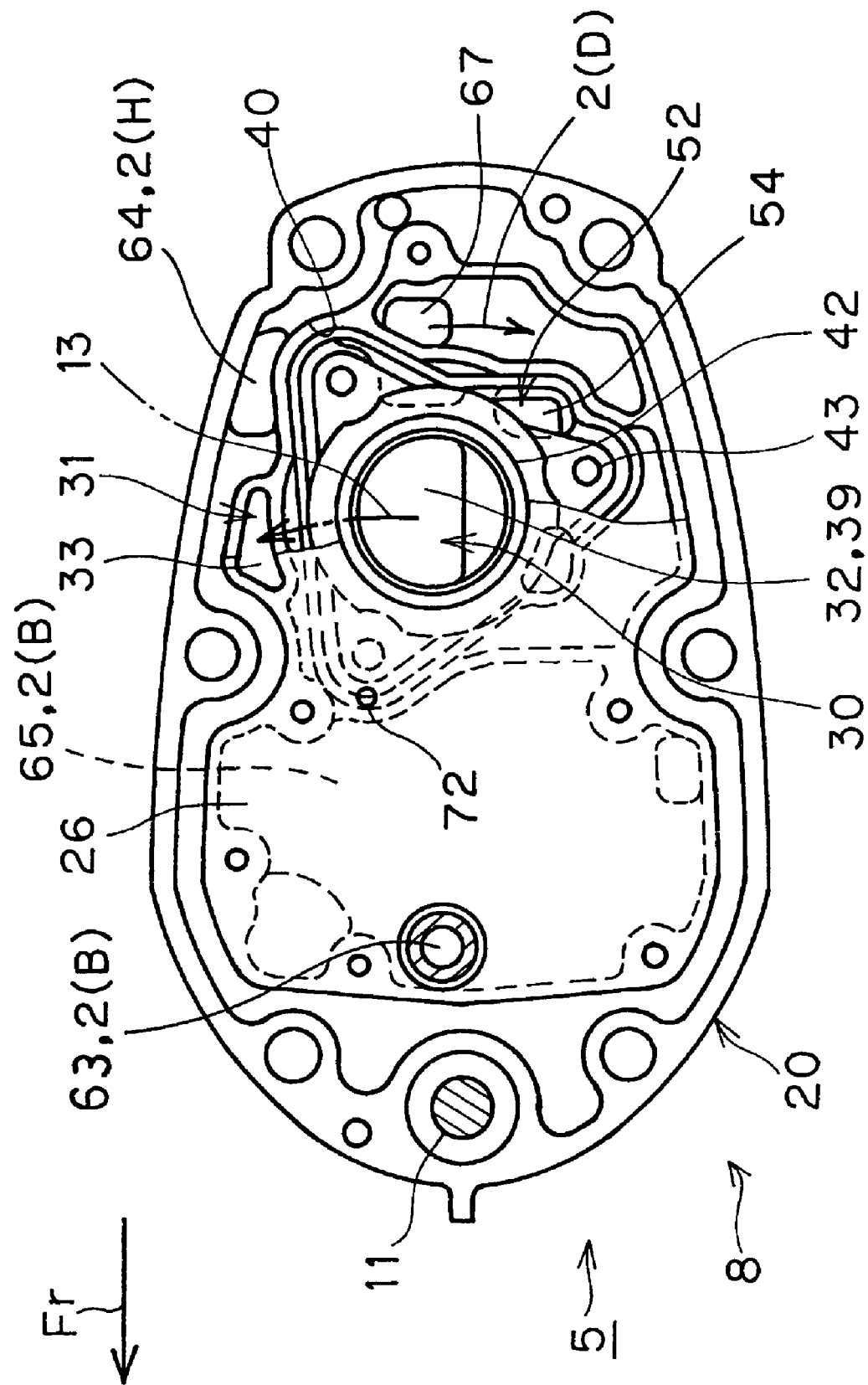
FIG. 7 is a view taken along the line 7-7 in FIG. 2.

In FIGS. 2 and 7, between the bottom surface of the oil pan 20 and the partition plate 26 is formed still another section 65 of the cooling water passage 52. The still other section 65 is in communication with the first supply passage 63.

Figure 9:
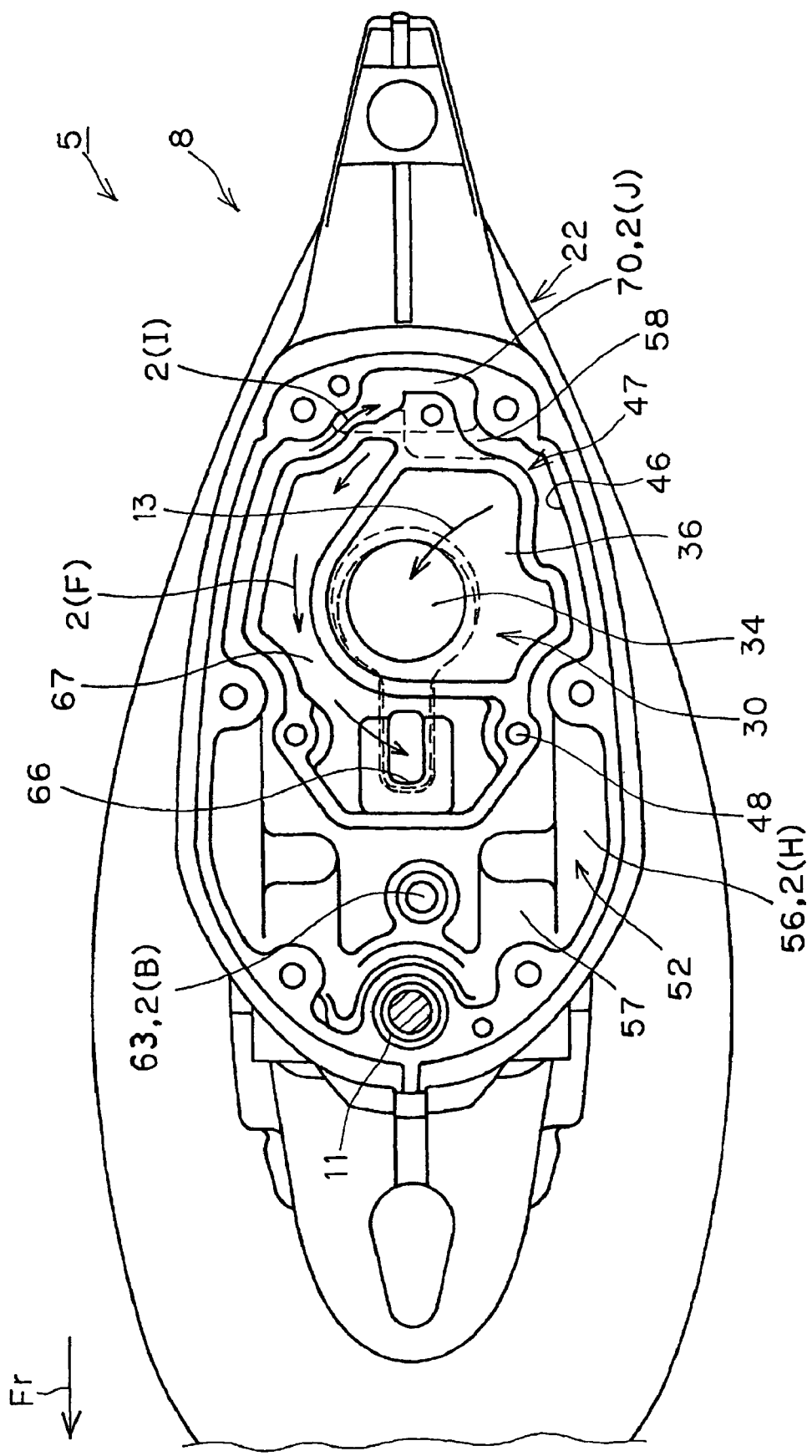
FIG. 9 is a view taken along the line 9-9 in FIG. 2.
Figure 10:
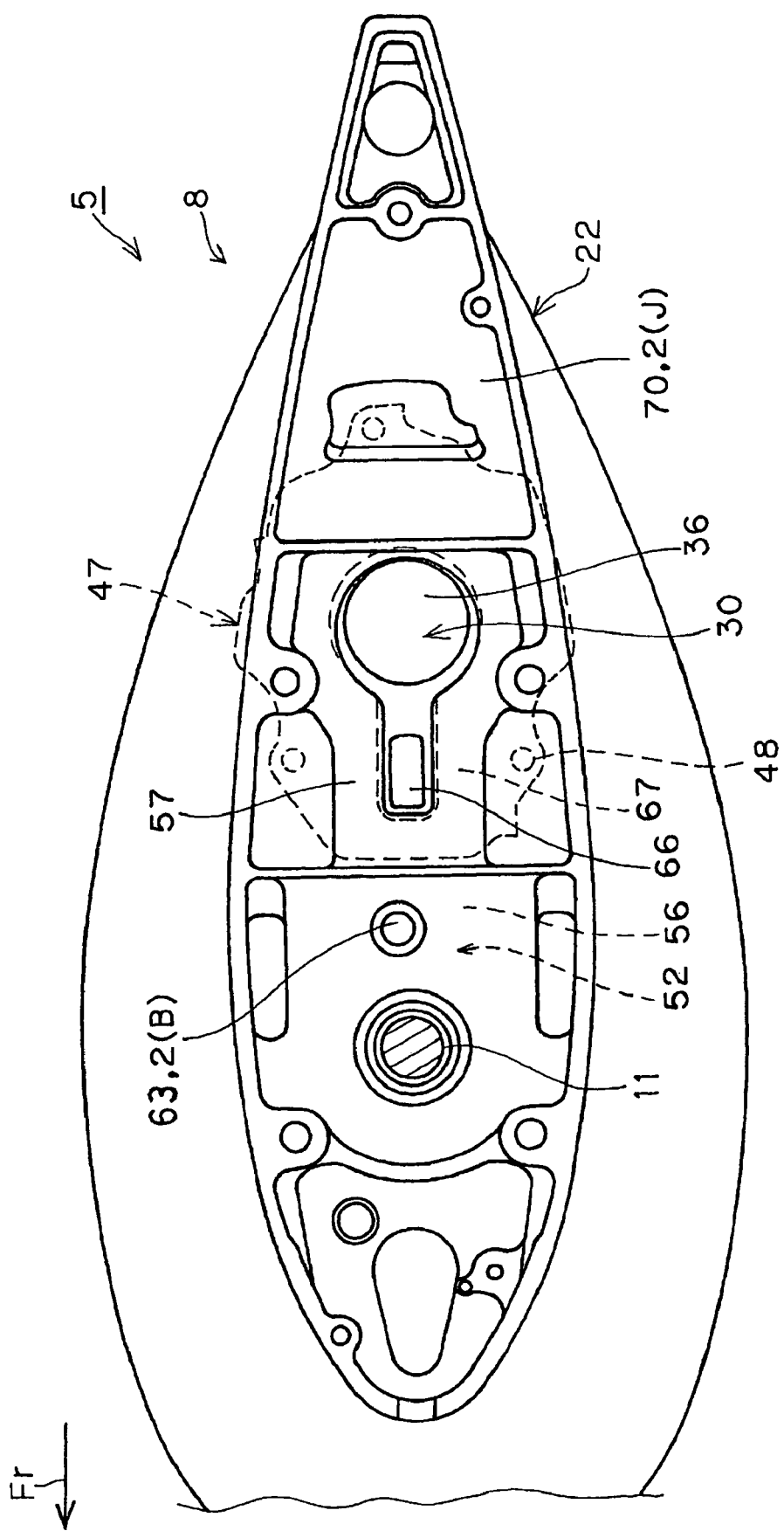
FIG. 10 is a view taken along the line 10-10 in FIG. 3.

In FIGS. 3, 9 and 10, a drain port 66, through which water 2 overflowing from the overflow opening 55 of the one section 54 of the cooling water passage 52 is discharged into the downstream-side passage 34 of the exhaust passage 30, is open to the downstream-side passage 34. Also, a guide passage 67 is formed for guiding water 2 overflowing from the overflow opening 55 to the drain port 66. The guide passage 67 is formed inside the wall constituting the muffler 47, that is, formed integral with the muffler 47.

In FIGS. 2, 3, 9 and 10, a drain port 69 through which water 2 overflowing from the other overflow opening 58 of the other section 56 of the cooling water passage 52 is formed in the lower casing 24. Also, a guide passage 70 for guiding water 2 overflowing from the other overflow opening 58 to the drain port 69 is formed extending across the boundary between the upper casing 22 and the lower casing 24 of the casing 8.

In addition, the bottom of the one section 54 of the cooling water passage 52, or the partition plate 26, is formed with a drain hole 72. Water 2 passing through the drain hole 72 is adapted to be discharged not into the exhaust passage 30 but into the guide passage 67 in the upper casing 22.

When the internal combustion engine 10 is started, the propeller 9 is driven in association with the internal combustion engine, to propel the watercraft 1. In this case, driving of the internal combustion engine 10 allows most of the exhaust gas 13 from the internal combustion engine 10 to be discharged into the body of water 2 through the exhaust passage 30. Also, part of the exhaust gas 13 (double dot and dash lines in FIGS. 2 and 6) is discharged directly into the atmosphere from the middle of the exhaust passage 30 through the branch passage 31. During idling of the internal combustion engine 10, the amount of exhaust gas 13 is small and its pressure is low. Therefore, most of the exhaust gas 13 reaching the middle of the exhaust passage 30 from the internal combustion engine 10 is discharged from here directly into the atmosphere through the branch passage 31. In this case, since the exhaust gas 13 passes through the expansion chambers 36, 37 of the exhaust passage 30 and the branch passage 31, exhaust noise is reduced.

When the internal combustion engine 10 is started, the water pump 59 is driven in association with the internal combustion engine. Then, water 2(A) is drawn into the water pump 59 through the intake passage 61 (FIGS. 1, 3 and 4). At the same time, water 2(B) is delivered from the water pump 59. The water 2(B) flows through the first supply passage 63 toward the cooling water passage 51 of the internal combustion engine 10 and the one section 54 of the cooling water passage 52 of the casing 8 (all figures).

The water 2(B) flowing through the first supply passage 63 is supplied to the foregoing still other section 65 of the cooling water passage 52. The lower end portion of the oil pan 20 is cooled by the water 2(B) circulating through the other section 65 (FIGS. 2 and 7).

Water 2(B) flowing through the first supply passage 63 cools down the internal combustion engine 10 because it flows through the cooling water passage 51 of the internal combustion engine 10. Water 2(C) flows toward the one section 54 of the cooling water passage 52 after cooling the internal combustion engine, to fill the one section 54 (FIGS. 2 and 4 to 7). Water 2(D) in the water surface of the water 2(C) filling the one section 54 of the cooling water passage 52, is overflowed from the overflow opening 55 (FIG. 2). As a result, the exhaust pipe 42 and the oil pan 20 are cooled.

Figure 6:
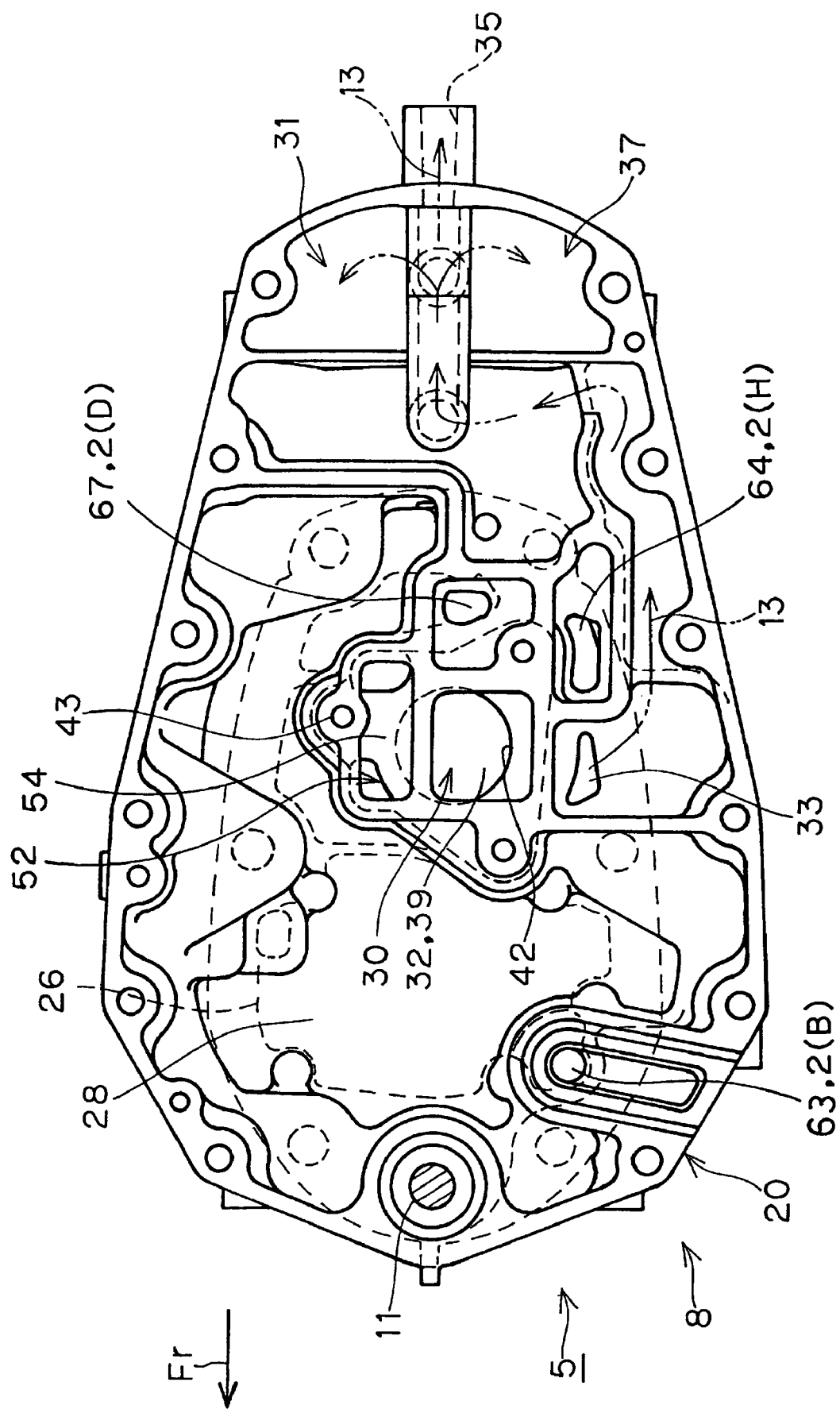
FIG. 6 is a view taken along the line 6-6 in FIG. 2.
Figure 8:
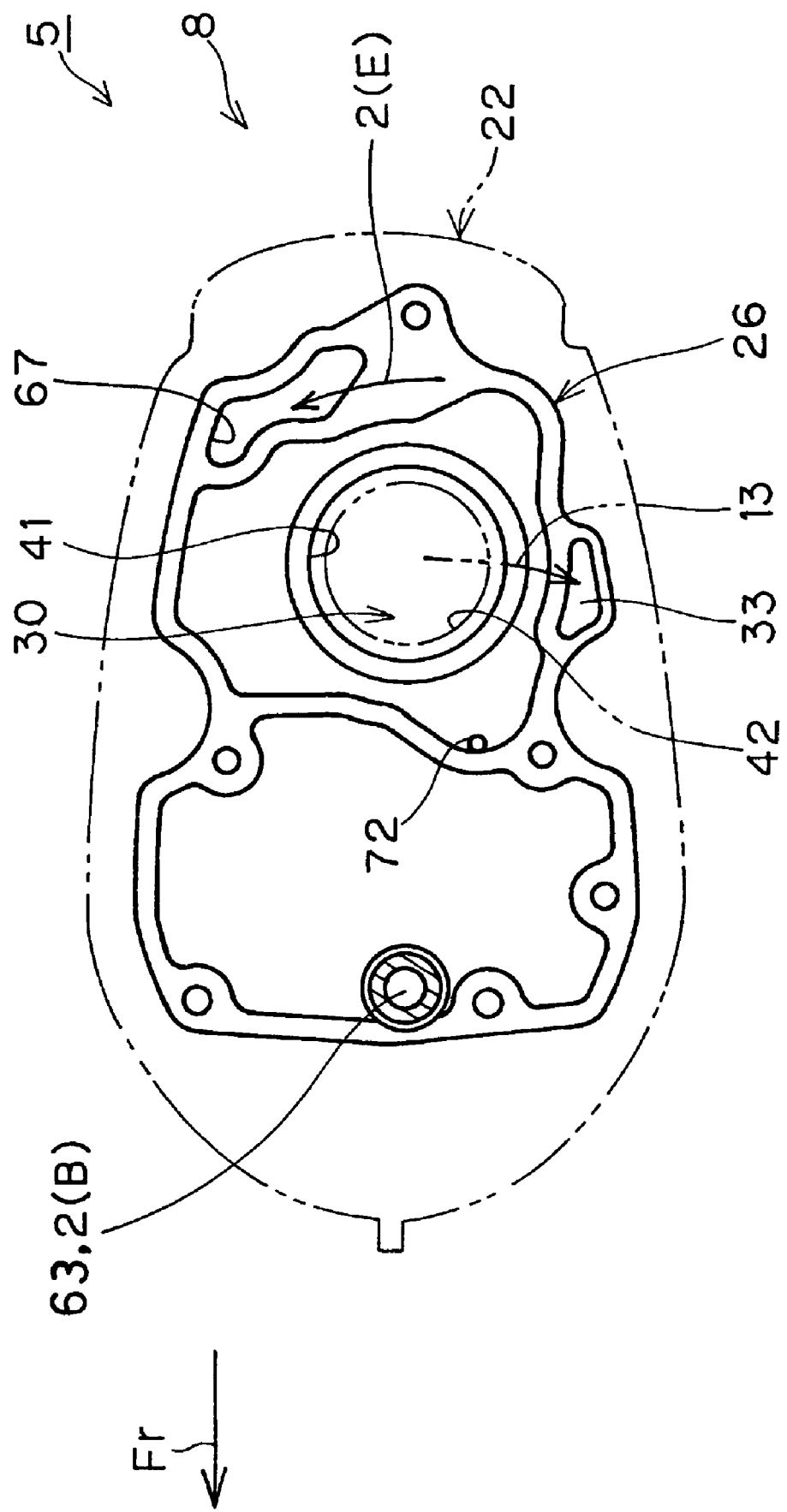
FIG. 8 is a plan view of a partition plate.

The water 2(D) overflowing from the overflow opening 55 first falls down to the guide passage 67 in the oil pan 20 (FIGS. 2, 6 and 7). Then, water 2(E) reaching the bottom of the guide passage 67 is guided to the guide passage 67 of the partition plate 26, to flow into the guide passage 67 in the upper casing 22 (FIG. 8). Water 2(F) guided to the guide passage 67 in the upper casing 22 is discharged into the downstream-side passage 34 of the exhaust passage 30 in the lower casing 24 through the drain port 66 (FIGS. 3, 9 and 10). Here, the water 2(F) is mixed with exhaust gas 13 flowing through the exhaust passage 30 and thereafter, returned into the body of water 2.

Figure 5:
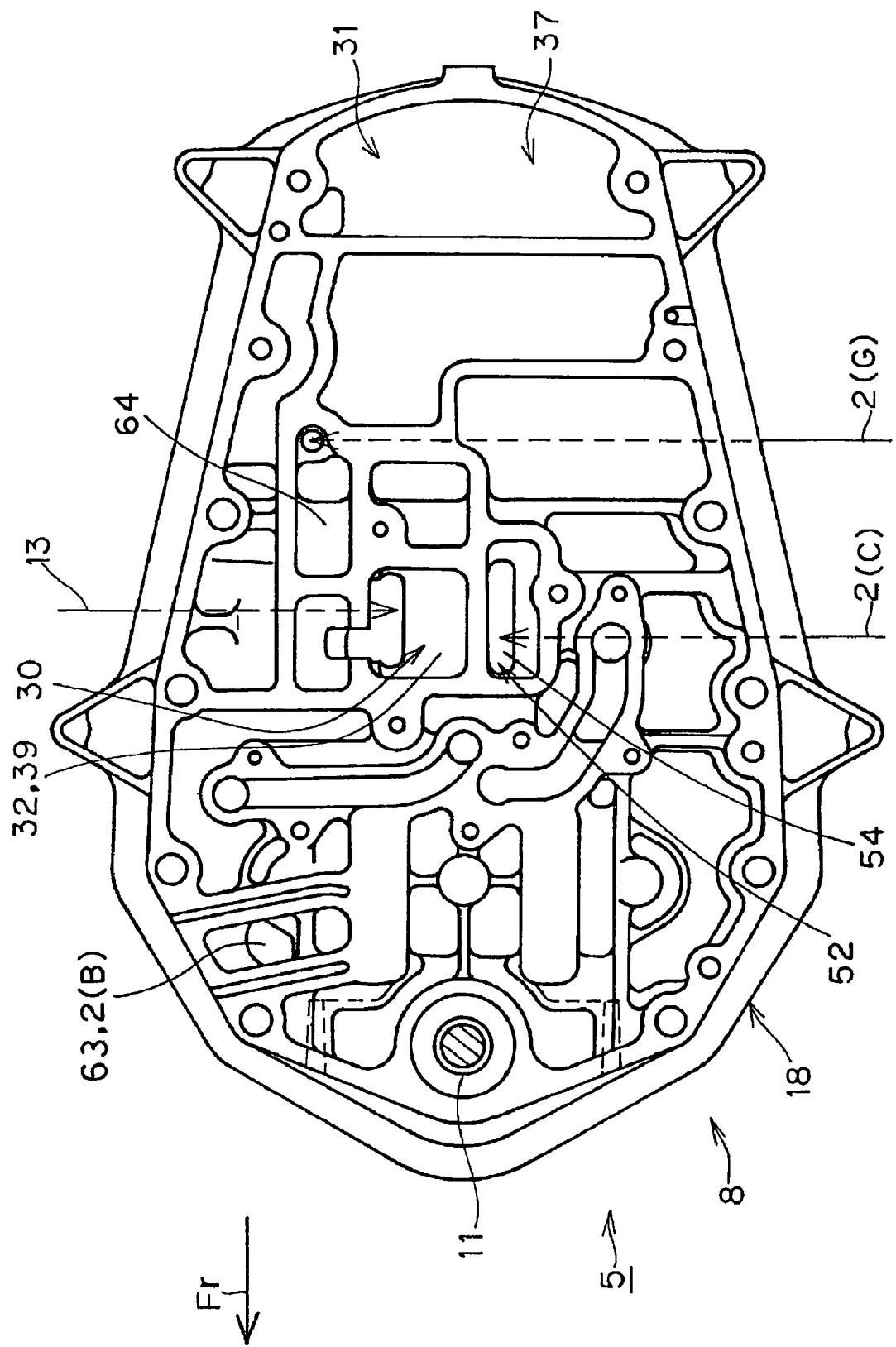
FIG. 5 is a view taken along the line 5-5 in FIG. 2.

On the other hand, water 2(G), flowing through the second supply passage 64 branching from the first supply passage 63, first flows into the second supply passage 64 of the guide exhaust 18 and then, it is directed toward the oil pan 20 (FIGS. 4 and 5). Thereafter, water 2(H), flowing from the second supply passage 64 of the guide exhaust 18 toward the oil pan 20, flows into the second supply passage 64 of the oil pan 20. The water 2(H) falls through the second supply passage 64 and flows from the second supply passage 64 toward the other section 56 of the cooling water passage 52 in the upper casing 22, to fill the other section 56 (FIGS. 2, 3, 6, 7, 9 and 10). Water 2(I) in the water surface of the water 2(H) filling the other section 56 of the cooling water passage 52 is overflowed from the other overflow opening 58 (FIGS. 2 and 9). As a result, the muffler 47 and the upper casing 22 are cooled.

Water 2(J) overflowing from the overflow opening 58 is guided to the guide passage 70 of the upper casing 22 and returned into the body of water 2 through the drain port 69 of the lower casing 24 (FIGS. 3, 9 and 10).

In the foregoing arrangement, the drain port 66, through which water 2 is discharged into the downstream-side passage 34 after passing through the cooling water passage 52, is open to the downstream-side passage 34.

Water 2 is discharged into the downstream-side passage 34 of the exhaust passage 30 through the drain port 66 after passing through the cooling water passage 52. The water 2 is mixed with exhaust gas 13 flowing through the downstream-side passage 34 and returned into the body of water 2.

The downstream-side passage 34 of the exhaust passage 30 is located in the lower part of the casing 8. The lower part of the casing 8, or the lower casing 24, is adapted to be submerged in the body of water 2, whose temperature is kept low. Therefore, the exhaust gas 13 reaching the downstream-side passage 34 of the exhaust passage 30 tends to be lower in temperature as a result of heat exchange with the lower part of the casing 8.

When water 2 discharged into the downstream-side passage 34 through the drain port 66 is mixed with exhaust gas 13 flowing through the downstream-side passage 34, the water 2 and a sulfur content in the exhaust gas 13 are prevented from reacting chemically. As a result, production of sulfuric acid is reduced, thereby improving the life of the outboard motor 5.

One section 54 of the cooling water passage 52 is formed extending along the upstream-side passage 32, an overflow opening 55 is formed in the casing 8 for connecting the upper part of the one section 54 of the cooling water passage 52 to the outside, and a guide passage 67 is formed for guiding water 2 overflowing from the overflow opening 55 to the drain port 66.

Exhaust gas 13, flowing through the upstream-side passage 32, has just been discharged from the internal combustion engine 10, whose temperature is very high. Therefore, the portion of the casing 8 around the upstream-side passage 32, or the exhaust pipe 42, tends to be heated to a high temperature. If the exhaust pipe 42 is heated to a high temperature, the possibility occurs of melting damage to the exhaust pipe 42, which is unfavorable for the life of the outboard motor 5.

However, in the foregoing arrangement, since one section 54 of the cooling water passage 52 extending along the upstream-side passage 32 is of an overflow type, it is filled with water 2 at all times. Therefore, the portion of the casing 8 around the upstream-side passage, or the exhaust pipe 42, is cooled more reliably and its temperature is kept lower. As a result, the exhaust pipe 42 is prevented from being damaged by melting due to heat of the exhaust gas 13, thereby improving the life of the outboard motor 5. In addition, whitening of the external surface of the oil pan 20 of the casing 8, in which the exhaust pipe 42 is inserted, is prevented.

In addition, as described above, the temperature of the portion of the casing 8 around the upstream-side passage 32, or the exhaust pipe 42, is kept low. Therefore, the temperature of the exhaust gas 13 passing through the upstream-side passage 32 in the exhaust pipe 42 is lowered. As a result, firstly, the muffler 47 is prevented from being exposed to a high temperature by the exhaust gas 13 passing through the expansion chamber 36 in the muffler 47 after passing through the upstream side passage 32. Therefore, whitening of the external surface of the upper casing 22 of the casing 8, in which the muffler 47 is inserted, is prevented. Secondary, the foregoing chemical reaction can be prevented more reliably.

A muffler 47 forming the expansion chamber 36 is provided and the guide passage 67 is formed integral with the muffler 47. Therefore, when water 2 overflowing from one section 54 of the cooling water passage 52 flows through the guide passage 67, the muffler 47 is cooled by the water 2 directly and in a wide area. That is, the water 2, which has cooled the portion of the casing 8 around the upstream-side passage 32, is utilized effectively for the cooling of the muffler 47. As a result, exhaust gas 13 flowing through the expansion chamber 36 in the muffler 47 is cooled effectively. Therefore, firstly, whitening of the external surface of the upper casing 22 of the casing 8, in which the muffler 47 is inserted, is prevented more reliably. Secondary, the foregoing chemical reaction is prevented even more reliably.

The other section 56 of the cooling water passage 52 is formed extending along the expansion chamber 36, and another overflow opening 58 is formed in the upper casing 22 of the casing 8 for connecting the upper part of the other section 56 of the cooling water passage 52 to the outside.

Therefore, because the other section 56 of the cooling water passage 52 is of an overflow type, it is filled with water 2 at all times. As a result, the portion of the casing 8 around the expansion chamber 36, or the upper casing 22 is cooled more reliably and its temperature is kept lower. Therefore, whitening of the external surface of the upper casing 22 of the casing 8 is prevented more reliably.

Additionally, as described above, the temperature of the portion of the casing 8 around the expansion chamber 36, or the upper casing 22, is kept low. As a result, the temperature of exhaust gas 13 passing through the expansion chamber 36 is lowered more effectively. Therefore, the foregoing chemical reaction can be prevented even more reliably.

Further, the other overflow opening 58 is disposed below one section 54 of the cooling water passage 52. Therefore, the one section 54 and the other section 56 of the cooling water passage 52 are separated from each other such that they do not interfere with each other. As a result, the structure of the cooling water passage 52 can be simplified, facilitating its forming work.

Here, when the water pump 59 is driven at a high speed in association with the internal combustion engine 10, a large amount of water 2 is supplied to the cooling water passage 52 from the water pump 59. At this time, the water 2 overflows from each of the overflow openings 55, 58. Therefore, the delivery pressure of the water pump 59 is prevented from becoming excessive. Since the excessive delivery pressure of the water pump 59 is prevented, seals associated with the cooling water passages 51, 52 are prevented from being damaged by the water pressure.

Although the foregoing inventions have been described in terms of certain preferred embodiments, other embodiments will become apparent to those of ordinary skill in the art in view of the disclosure herein. Furthermore, the skilled artisan will recognize the interchangeability of various features of one modification of the motor to another modification. Accordingly, the present inventions are not intended to be limited by the recitation of preferred embodiments described above.

What is claimed is:

1. A water cooling system for an outboard motor, the system comprising a casing configured to be submerged in water at a lower part of the outboard motor and configured to support an internal combustion engine on an upper part thereof, an exhaust passage formed in the casing and configured to guide exhaust gas from the engine and through the upper part of the easing toward the lower part, a portion of the exhaust passage between an upstream-side passage and a downstream-side passage being configured to define an expansion chamber, a cooling water passage extending along the exhaust passage, and a drain port configured to permit water to be discharged into the exhaust passage at a point downstream of the expansion chamber after passing though the cooling water passage, wherein a first section of the cooling water passage extends along the upstream-side passage, wherein a second section of the cooling water passage extends along the expansion chamber, a second overflow opening is formed in the casing for connecting the upper part of the second section of the cooling water passage to the outside, and the second overflow opening is disposed below the first section of the cooling water passage.

2. An outboard motor comprising an internal combustion engine, a casing disposed below the engine, an exhaust passage extending though the casing, an oil pan configured to reserve oil for lubricating the engine, a partition plate, and a cooling water passage; the casing including an upper portion connected to a bottom surface of the oil pan, the partition plate being connected directly to the bottom surface of the oil pan and disposed between the upper casing and the bottom surface of the oil pan, the exhaust passage including an upstream end, a downstream end and an expansion chamber disposed between the upstream end and downstream end, in the direction of exhaust gas flow through the exhaust passage, the upstream end being connected to the engine such that exhaust gas discharged from the engine flows into the upstream end, the upstream end of the exhaust passage comprising an exhaust pipe that protrudes into an interior of the expansion chamber, the cooling water passage extending along side of the exhaust passage in thermal communication therewith and past the expansion chamber, the cooling water passage having an outlet arranged to discharge cooling water into the exhaust passage at a point downstream of the expansion chamber.

3. The outboard motor of claim 2 additionally, comprising at least one fastener extending through the partition plate and into the bottom surface of the oil pan and at least one fastener extending through the upper casing and into the bottom surface of the oil pan.

* * * * *

UNITED STATES PATENT AND TRADEMARK OFFICE
CERTIFICATE OF CORRECTION

PATENT NO. : 7,497,750 B2
APPLICATION NO. : 11/133986
DATED : March 3, 2009
INVENTOR(S) : Nakata et al.

It is certified that error appears in the above-identified patent and that said Letters Patent is hereby corrected as shown below:

At column 8, line 37, in Claim 1, please change "easing" to --casing--.

At column 8, line 43, in Claim 1, please change "though" to --through--.

At column 8, line 54, in Claim 2, please change "though" to --through--.

At column 8, line 56, in Claim 2, please change "passage;" to --passage,--.

Signed and Sealed this

Twenty-fifth Day of August, 2009

David J. Kappos
*Director of the United States Patent and Trademark Office*